(12) United States Patent
Reid et al.

(10) Patent No.: US 10,909,761 B1
(45) Date of Patent: Feb. 2, 2021

(54) 2D VIDEO WITH OPTION FOR PROJECTED VIEWING IN MODELED 3D SPACE

(71) Applicant: GOOGLE LLC, Mountain View, CA (US)

(72) Inventors: Bryce Reid, Mountain View, CA (US); Samuel Kvaalen, Mountain View, CA (US); Gabriel Dottl, Mountain View, CA (US)

(73) Assignee: Google LLC, Mountain View, CA (US)

( * ) Notice: Subject to any disclaimer, the term of this patent is extended or adjusted under 35 U.S.C. 154(b) by 396 days.

(21) Appl. No.: 15/204,397

(22) Filed: Jul. 7, 2016

(51) Int. Cl.
*G06T 19/00* (2011.01)
*H04N 21/274* (2011.01)
*G02B 27/01* (2006.01)
*H04N 21/2187* (2011.01)
*H04N 21/235* (2011.01)

(52) U.S. Cl.
CPC .......... *G06T 19/006* (2013.01); *G02B 27/017* (2013.01); *H04N 21/2187* (2013.01); *H04N 21/2353* (2013.01); *H04N 21/274* (2013.01)

(58) Field of Classification Search
CPC G06T 19/006; G02B 27/017; H04N 21/2187; H04N 21/2353; H04N 21/274
See application file for complete search history.

(56) References Cited

U.S. PATENT DOCUMENTS

| | | | |
|---|---|---|---|
| 5,640,171 A | 6/1997 | Shimada | |
| 6,657,637 B1 | 12/2003 | Inagaki et al. | |
| 7,583,275 B2 | 9/2009 | Neumann et al. | |
| 8,878,846 B1 | 11/2014 | Francis, Jr. et al. | |
| 2007/0011273 A1* | 1/2007 | Greenstein | G06Q 10/10 709/217 |
| 2010/0328204 A1 | 12/2010 | Edwards et al. | |
| 2012/0229508 A1 | 9/2012 | Wigdor et al. | |
| 2015/0205106 A1 | 7/2015 | Norden | |
| 2016/0171814 A1* | 6/2016 | Froy, Jr. | G07F 17/3211 463/20 |
| 2016/0286208 A1* | 9/2016 | Drouin | H04N 13/0011 |
| 2016/0364907 A1* | 12/2016 | Schoenberg | G06T 17/205 |

OTHER PUBLICATIONS

Mark Segal, et al., "Fast Shadows and Lighting Effects Using Texture Mapping", Computer Graphics, Jul. 1, 1992, 4 pages.
Ismail Oner Sebe, et al., "3D Video Surveillance with Augmented Virtual Environments", IWVS '03 First ACM SIGMM International workshop on Video surveillance, Nov. 2, 2003, 6 pages.

(Continued)

*Primary Examiner* — LaTanya Bibbins (57) ABSTRACT

A multimedia distribution system enables a user to view 2D video content in a conventional 2D or "flat" viewing mode, or if the system is VR/AR enabled and the user is so inclined, a representation of a modeled 3D space may be provided or accessed in association with the 2D video content, and the 2D video content may be projected onto a specified surface within the modeled 3D space for viewing by the user as though the 2D video were being displayed at that surface/location within the modeled 3D space. Further, the pose of the user may be monitored and the projection of the 2D video content updated accordingly to match the user's current pose and view into the modeled 3D space.

24 Claims, 7 Drawing Sheets

(56) References Cited

OTHER PUBLICATIONS

How to Project on 3D Geometry, <https://vvvv.org/documentation/how-to-project-on-3d-geometry>, Accessed May 3, 2016, 4 pages.
Notification to Make Rectification (and translation thereof) dated Dec. 7, 2017 for Chinese Utility Model Application No. 201720824106.2, 4 pages.
Combined Search and Examination Report dated Dec. 1, 2017 for Great Britain Application GB1710886.1, 9 pages.
Darren Orf, "I watched Netflix in VR and now reality seems hollow and pointless", gizmodo.com, <https://gizmodo.com/I-watched-Netflix-in-vr-and-now-reality-seems-hollow-an-1732886649>, Accessed Nov. 22, 2017, 2 pages.
Rasmus K0nig S0renson, "Review: Samsung Gear VR", flatpanelshd.com, <https://www.flatpanelshd.com/review.php?subaction=showfull&id=1454323473, Accessed Dec. 14, 2017, 12 pages.
Game Hard 4.0, Mar. 28, 2016, "Oculus Video App (Very impressive theaters)", youtube.com, <https://youtube.com/watch?v=mfjmSEcGUHc>, Accessed Nov. 22, 2017, 5 pages.
FrameGame, Nov. 9, 2013, "Oculus Rift—2D, 3D, and 4D Multiplayer Movie Player?!", youtube.com, <https://www.youtube.com/watch?v=FQfYo1ONiCw>, Accessed Nov. 22, 2017, 5 pages.
International Search Report and Written Opinion of the International Searching Authority dated Sep. 25, 2017 for Application No. PCT/US2017/040181, 17 pages.
David Jagneaux, "'Big Screen' Lets You Share and Use Your PC Desktop in VR", Mar. 11, 2016, uploadvr.com, <https://uploadvr.com/bigscreen-lets-you-share-use-your-entire-pc-desktop-inside-vr/>, Accessed Dec. 14, 2017, 4 pages.
Anonymous, "Cmoar VR Cinema Impressions—VR Pill", Jun. 22, 2015, <http://www.vrpill.com/apps/app-impressions/cmoar-vr-cinema-impressions/>, Accessed Dec. 14, 2017, 4 pages.

\* cited by examiner

2D VIDEO WITH OPTION FOR PROJECTED VIEWING IN MODELED 3D SPACE

BACKGROUND

Field of the Disclosure

The present disclosure relates generally to multimedia systems and, more particularly, to virtual reality and augmented reality display systems.

Description of the Related Art

Multimedia content servers, multimedia disc players, and other sources of multimedia content facilitate the viewing of two-dimensional (2D) video content on users' televisions, monitors, compute-enabled cell phones, compute-enabled watches, and other display devices. With the advent of consumer-level virtual reality (VR) and augmented reality (AR) systems, such 2D video presentations often suffer from a lack of context or "presence" in comparison with VR and AR display content. However, in conventional display systems, users are limited to either viewing 2D video content in the traditional flat display mode, or watching entirely-unrelated VR or AR content.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Conventional display systems limit the viewing of 2D video content to the traditional 2D, or "flat" viewing mode in which the 2D video content is displayed in a corresponding window or 2D region of an operating system (OS) or software application display region. AR/VR systems, in contrast, permit the viewing of modeled 3D spaces and other 3D content, and many such systems permit a user to effectively "move" through a 3D space through tracking of the pose (location and/or orientation) of the VR/AR equipment using various sensors. As described in greater detail herein, a 2D/3D multimedia distribution system enables a user to view 2D video content in the conventional 2D or "flat" viewing mode, or if the system is VR/AR enabled and the user is so inclined, a representation of a modeled 3D space may be provided or accessed in association with the 2D video content, and the 2D video content may be projected onto a specified surface within the modeled 3D space for viewing by the user as though the 2D video were being displayed at, or otherwise projected from, that surface within the modeled 3D space. Further, in some embodiments, the pose of the user may be monitored and the projection of the 2D video content updated accordingly to match the user's current pose and view into the modeled 3D space.

To illustrate by way of a non-limiting example, a YouTube™ user who regularly uploads 2D video clips of the user playing various video games may model the user's game room and upload a representation of the resulting 3D model of the game room in association with one or more of the 2D video clips. The 2D video clips then may be streamed as streaming video files to other users via the YouTube™ service. These other users, depending on the VR/AR capabilities of their respective compute systems, may elect to either watch one of the 2D video clips in a traditional flat 2D display mode in a web browser, or watch one of the 2D video clips via a head mounted display (HMD) or other VR display such that the 2D video clip is projected onto a surface corresponding to a computer monitor in the 3D model of the game room, and thus appearing as though the 2D video clip were being displayed "at" the computer monitor in the 3D model of the game room. If the user has 3 degrees of freedom (3 DoF) or 6 degrees of freedom (6 DoF) capabilities via the VR display, the user may change locations and/or change orientations, and thus changing the view perspective of the computer monitor and the 2D video content appearing to be displayed thereon.

Figure 1:
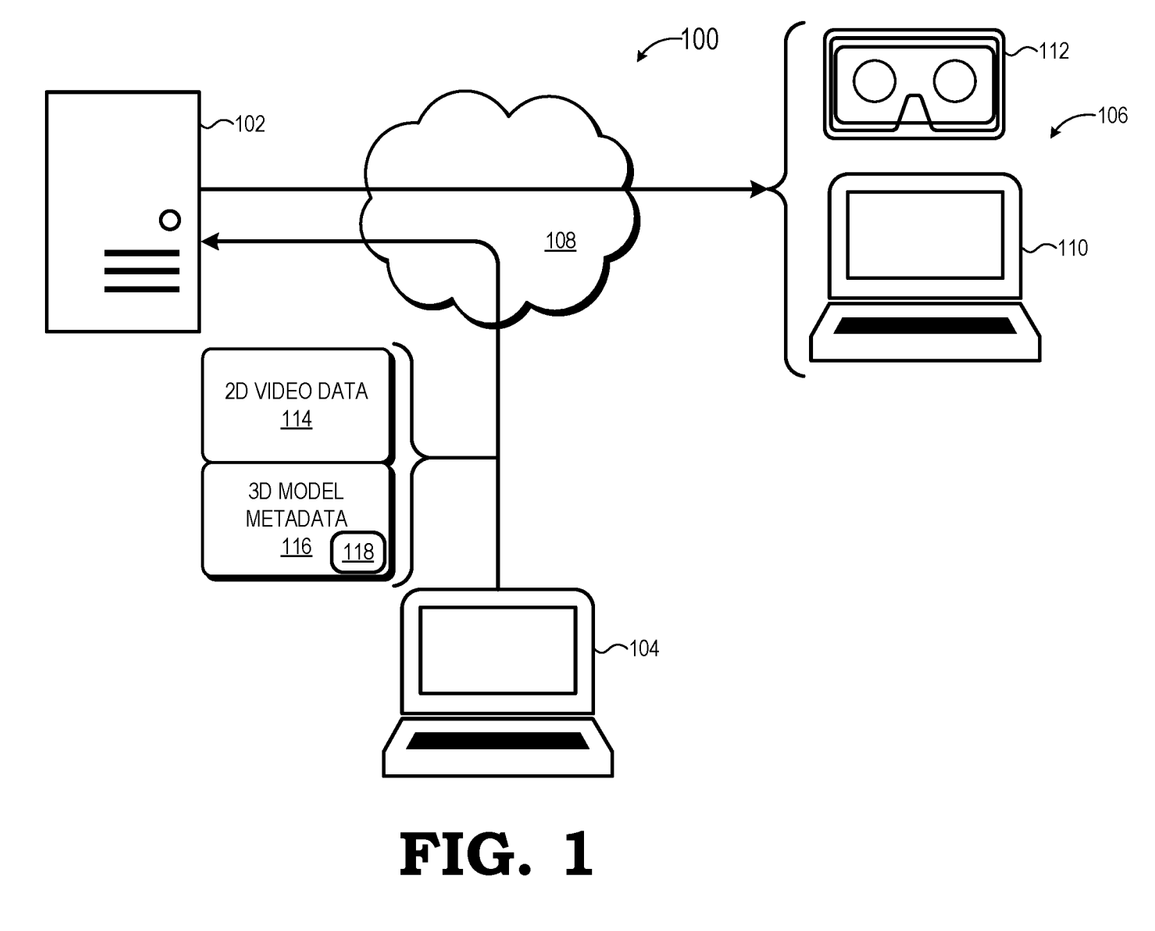
FIG. 1 is a block diagram illustrating a multimedia distribution system in accordance with some embodiments.

FIG. 1 illustrates a 2D/3D multimedia distribution system 100 in accordance with at least one embodiment of the present disclosure. In the depicted example, the system 100 includes a multimedia server 102 connected to a plurality of user compute systems, such as user compute systems 104, 106, via one or more wired or wireless networks 108. The user compute systems 104, 106 may comprise any of a variety of devices or combinations of devices used to capture and/or present multimedia content, such as desktop computers, notebook computers, tablet computers, compute-enabled cellular phones, personal digital assistants, game consoles, compute-enabled televisions, compute-enabled watches and other wearables, HMDs or other AR/VR display devices, and the like.

For the following, the user compute system 104 is utilized as a source of video content and a source of a 3D model of a virtual or real-world space, and thus is referred to herein as the content source system 104, whereas the user compute system 106 is used to present 2D video content to a user in either a 2D view mode or 3D view mode, and thus is referred to herein as the 2D/3D display system 106. The 2D/3D display system 106 includes a 2D display device 110 for displaying 2D video content in a 2D/flat display mode wherein the 2D video content is displayed as a 2D rectangular window on a display panel or monitor of the 2D display device 110. Examples of such devices include desktop/notebook computers, compute-enabled cellular phones, tablet computers, and the like. Further, in some instances, the 2D/3D display system 106 further may include a VR/AR display device 112 capable of displaying 3D video content. The VR/AR display device 112 may comprise, for example, a separate dedicated HMD or may be implemented through configuration of the 2D display device 110 in a particular manner (such as the Google Cardboard VR view in which a compute-enabled cellular phone is inserted into cardboard headgear to form an HMD). In such instances, the 2D/3D display system 106 is capable of operating in either a 2D view mode in which 2D video content is displayed in a 2D window, or in a 3D view mode in which a modeled 3D space is presented via the VR/AR display device 112 and, as described in greater detail below, 2D video content is projected onto a specified surface of the modeled 3D space. Note that in some instances the devices 110, 112 may comprise the same device.

In operation, the content source system 104 generates or otherwise procures 2D video data 114 that represents 2D video content and provides the 2D video data 114 to the multimedia server 102 for storage and subsequent distribution to other users. The 2D video data 114 may comprise, for example, a video clip or other video stream recorded by a user of the content source system 104 (this user being referred to herein as a "content provider"). Additionally, the content provider manipulates the content source system 104 to generate or otherwise procure a 3D model of a virtual space or real-world space that can serve as a setting for the 3D display of the 2D video content, and provide a representation of this 3D model as 3D model metadata 116 to the multimedia server 102 for distribution to recipients of the 2D video data 114. The 3D model metadata 116 may be incorporated as part of the 2D video data 114. To illustrate, the 2D video data 114 may be implemented as H.264 video data and 3D model metadata 116 can be incorporated as metadata in the H.264 data using any of a variety of metadata injection techniques. As another approach, the 3D model metadata 116 may be encoded into the pixels of the video content itself using any of a variety of steganography tools used to embed data in pixel information. Alternatively, the 3D model metadata 116 may be provided separately from, but in association with, the 2D video data 114. To illustrate, the 2D video data 114 may include or reference an identifier (ID) that identifies the 3D model metadata 116. This ID may include, for example, a name of the file or other data container containing the 2D video data 114. As another example, the ID may be provided in the form of a remote storage location ID, such as a hypertext transfer protocol (HTTP) link, associated with the storage location of the 3D model metadata 116.

The 3D model of the identified VR space or real-world space may be generated in any of a variety of ways. In some embodiments, the content source system 104 has the facility to capture imagery and/or depth information for a real-world room or other real-world space and use this information to generate a VR model of the real-world space. To illustrate, the content source system 104 may be implemented as, or employ, a Google Project Tango-enabled tablet or cell-phone to map out one or more rooms with real geometry and combine this data with captured image data to generate a textured 3D model of the one or more rooms. In other embodiments, the 3D model may be an entirely VR space that is created using a computer-aided design (CAD) tool or other VR modeling tool.

With the 3D model so determined, the content provider further operates the content source system 104 to identify a surface within the modeled space upon which the 2D video content may be effectively "projected" so as to appear as 2D video being "displayed" on that surface within the modeled space. This surface is referred to herein as the "projection surface." In some embodiments, the projection surface may comprise, for example, a rectangular planar surface with the four corners of the rectangular surface identified by four corresponding 3D coordinate points in the reference coordinate system of the 3D model. In other embodiments, the surface may take on other planar shapes with corners and/or edges defined by the corresponding 3D coordinate points. In yet other embodiments, the projection surface may have a non-planar shape, such as a curved surface or a faceted surface, in which instances the projection surface may be identified using a geometric mesh or other representation.

To illustrate, the surface may be specified as a point in 3D mesh space that represents the environment along with a normal vector indicating the direction to which the projection surface should be facing, and a maximum width/height indicator (e.g., in meters) within that mesh space. Between these, a rectangular 2D video could be rendered with an arbitrary amount of curving and work with an arbitrary aspect ratio. Alternatively, a content provider could provide a 2D mesh and texture coordinates onto which their video should be rendered, which is positioned in the same space as the environment mesh. This mesh typically would need to be altered to change depending on the aspect ratio of the current video to avoid letterboxing. This would enable content providers to create pseudo-6 DoF video with a static mesh by subdividing the video texture into different regions and then providing a potentially disjoint mesh onto which the video would be rendered. In this way, a simple setup is enabled in which a content provider could render two video screens in space with separate content simply by having a mesh which puts two quads into the environment and provides texture coordinates such that each quad gets a different half of the video allowing effectively two video surfaces. This could also be implemented with arbitrary meshes; for example, in an environment could include an individual sitting on a couch with a static texture as part of the environment, but then on top of that, a content provider could place part of the video texture over the face (with a mesh that would conform to that face) so that the face can react with the video.

With the projection surface so identified, the content source system 104 incorporates a representation of the projection surface into the 3D model metadata 116 as projection location information 118. Depending on the characteristics of the projection surface, the projection location information 118 may include, for example, representations of the points or corners of the projection surface, a representation of the geometric mesh representing the projection surface, or 3D point and vector as noted above, and the like.

With the 2D video data 114 and 3D model metadata 116 uploaded to the multimedia server 102, other users are then able to access the 2D video data 114 for display at their respective display systems 106. Thus, when a user selects the 2D video content represented by the 2D video data 114 for playback (e.g., by clicking on an associated HTTP link in a hypertext markup language (HTML) page being viewed in a web browser displayed at the display system 106), the multimedia server 102 initiates transfer of the 2D video data 114 to the display system 106. The 2D video data 114 may include an indicator that the 2D video data 114 has a 3D display option in addition to the conventional 2D display option. For example, a header or other field of the container for the 2D video data 114 may include a value representing the availability of this option. In response to identifying the 3D view mode availability for the 2D video data 114, the display system 106 determines whether it has the capability to display 3D content, such as by determining whether the display system 106 includes a VR/AR display device 112. If 3D display capability is present, the display system 106 may provide the user the option to view the 2D video content of the 2D video data 114 in a conventional 2D view mode, whereupon the 2D video content is displayed in a 2D rectangular window or box, or in a 3D view mode, whereupon the VR/AR display device 112 is used to immerse the user into the modeled 3D space represented by the 3D model metadata 116 and the 2D video content is projected into the projection surface within the modeled 3D space as specified by the projection location information 118. These modes of display are described in greater detail herein.

Figure 2:
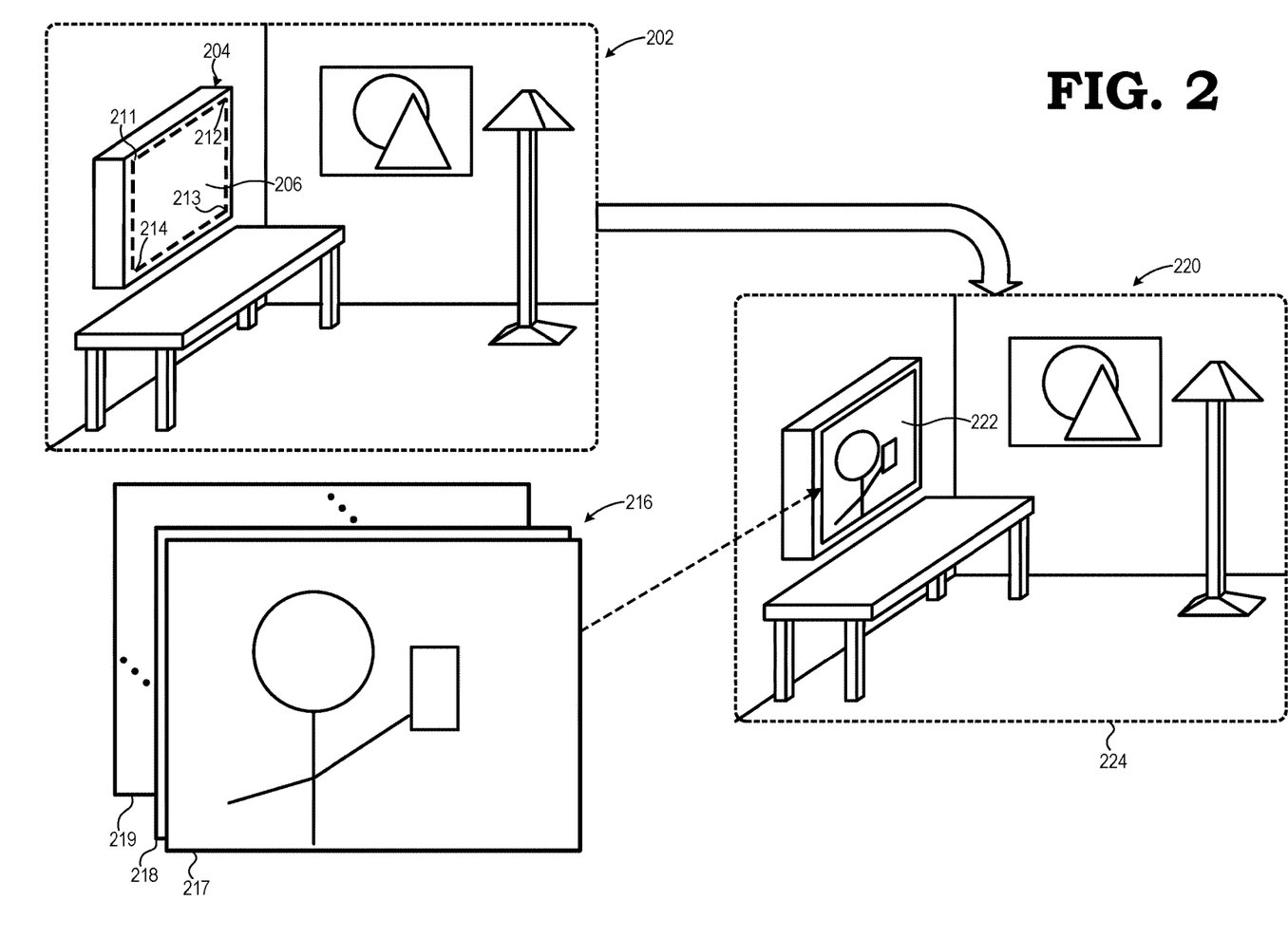
FIG. 2 is a diagram illustrating a projection of 2D video content into a specified location in a modeled 3D space in accordance with some embodiments.

FIG. 2 illustrates an example of a modeled 3D space with designated projection surface in accordance with some embodiments. A content provider (that is, a user of the content source system 104) generates a 3D model 202 of a space, either through capture of imagery and depth information for a real-world space and "virtualization" of the geometry contained therein, or through design of a virtual space from the ground up. In the depicted example, the modeled space is the user's living room, which contains a modeled representation of a television 204. The content provider further designates the display surface of the television 204 as a projection surface 206 for projecting 2D video content into the modeled 3D space represented by 3D model 202. The projection surface 206 may be identified within the 3D model 202 by, for example, specifying the 3D coordinates within the coordinate frame of the 3D model 202 of the four corners 211, 212, 213, 214 of the rectangular planar surface represented by the projection surface 206.

The content provider also specifies a 2D video stream 216 for display either in a conventional flat 2D view mode or for projection onto the projection surface 206 for a 3D view mode. The 2D video stream 216 comprises a sequence of 2D pictures, such as the illustrated 2D pictures 217, 218, 219. Accordingly, as described in greater detail herein, when a content consumer (that is, a user of the 2D/3D display system 106) accesses the 2D video data 114 and 3D model metadata 116 from the multimedia server 102 (FIG. 1) and selects the 3D view mode, a 3D representation 220 of the 3D model 202 is displayed to the content consumer via the VR/AR display device 112, where perspective of the 3D model 202 may be based on the current pose of the VR/AR display device 112 if the VR/AR display device 112 is enabled for pose tracking. To provide the projected 3D view of the 2D video stream within the 3D representation 220, the 2D/3D display system 106 uses any of a variety of coordinate system transform algorithms to transform each picture of the 2D video stream 216 from a 2D coordinate frame into a corresponding texture 222 in the coordinate frame of the 3D model, and the resulting texture 222 is incorporated into the projection surface 206 of one or more pictures 224 displayed at the VR/AR display device 112 in providing display of the 3D representation 220.

Figure 3:
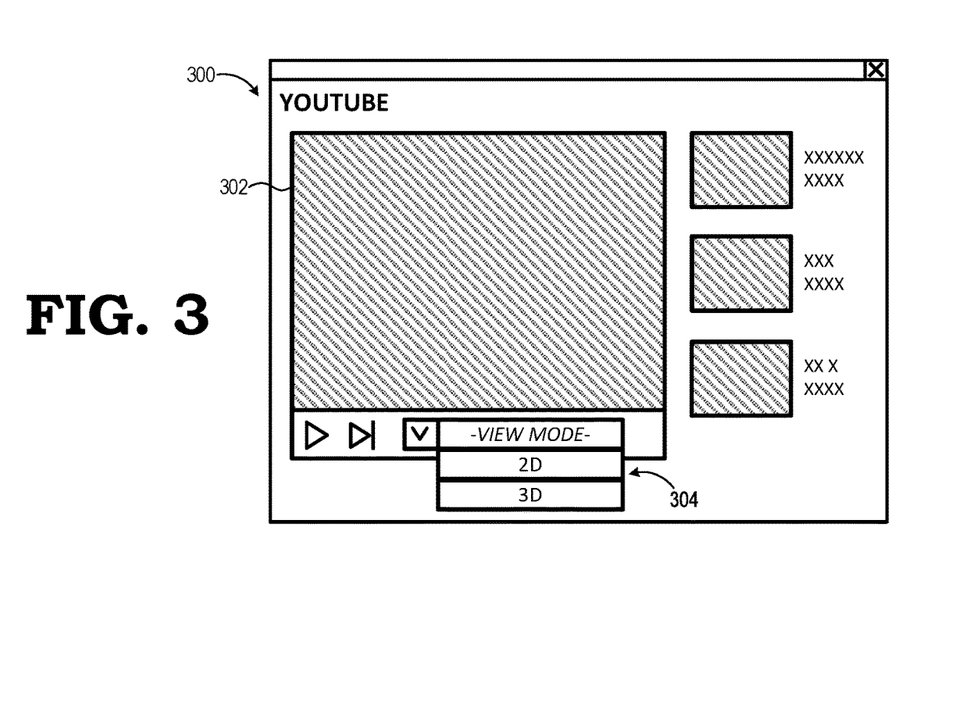
FIG. 3 is a diagram illustrating a multimedia application providing 2D/3D display options for a 2D video stream in accordance with some embodiments.
Figure 4:
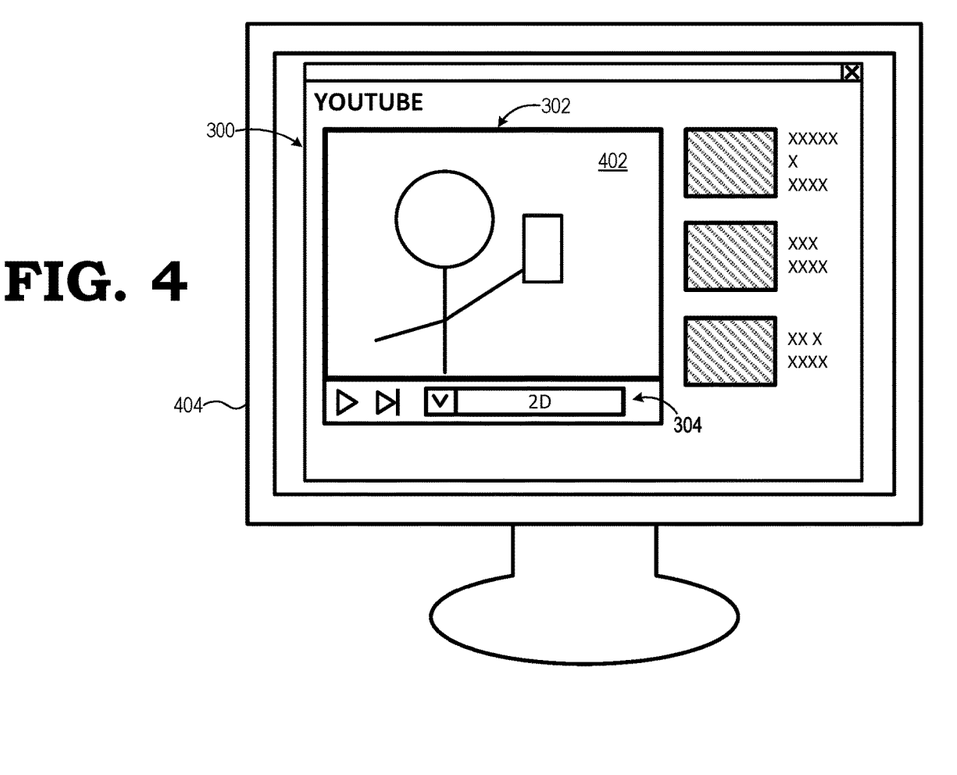
FIG. 4 is a diagram illustrating a 2D, or "flat", display of a 2D video stream responsive to selection of a 2D display option in the multimedia application of FIG. 3 in accordance with some embodiments.
Figure 5:
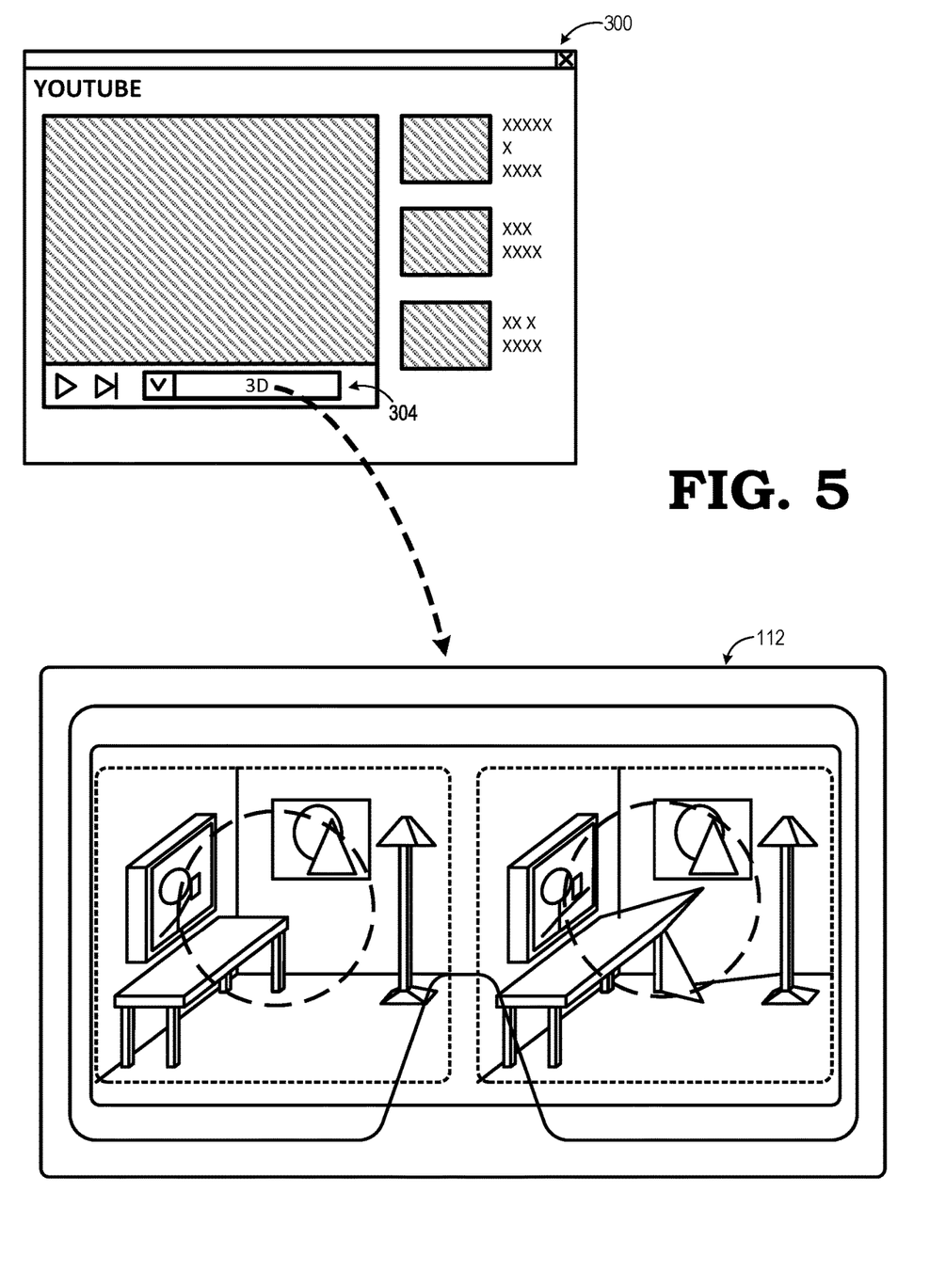
FIG. 5 is a diagram illustrating a display of a 2D video stream projected into an identified surface of a modeled 3D space responsive to selection of a 3D display option in the multimedia application of FIG. 3 in accordance with some embodiments.

As explained above, a content consumer (that is, a user of the system 106) may not have the equipment or desire to view 2D video content projected into a 3D space, and thus the content consumer may be provided with the ability to select between a 2D view mode or a 3D view mode for the 2D video content. FIG. 3 illustrates an example approach to providing the content consumer this option to select the display mode, FIG. 4 illustrates an example approach to the 2D view mode when so selected, and FIG. 5 illustrates an example approach to the 3D view mode when so selected. As shown in FIG. 3, the content consumer may initially access or otherwise indicate a desire to view a streaming video file or other video stream through input to, or other manipulation of, a graphical user interface (GUI) of a software application 300 at the 2D/3D display system 106. In the illustrated example, the software application 300 comprises a web browser that has accessed a video-sharing website, such as the YouTube™ website (served, for example, by the multimedia server 102). The content consumer selects, via the web browser, a 3D-display-enabled video clip. In response, a 2D display window 302 is presented, along with a view selection field 304 (depicted in this example as a drop-down menu) identifying the view modes available for the video clip, that is, a 2D view mode and a 3D view mode. In instances where the 2D/3D display system 106 is not capable of providing for 3D display, or in instances where a selected clip is not 3D-display-enabled, the view selection field 304 may not depict the 3D view mode as an option, or may prevent selection of the 3D view mode option. The content consumer then may manipulate the view selection field 304 to select whether the 2D video clip is to be displayed in a flat 2D presentation or is to be displayed via projection of the 2D video content onto a projection surface of a modeled 3D space associated with the video clip.

As shown by FIG. 4, when the content consumer elects to view the 2D video clip in the 2D view mode by selecting "2D" in the drop-down menu representing the view selection field 304, the software application 300 (as web browser) accessed the 2D video data 114 and provides the 2D video content 402 represented therein for display in the 2D display window 302 of the software application 300 at a display panel 404 of the 2D/3D display system 106 per conventional 2D video display techniques. In contrast, as shown by FIG. 5, when the content consumer elects to view the 2D video clip in the 3D view mode by selecting "3D" in the drop-down menu representing the view selection field 304, the software application 300 enables the 3D view mode, in which software application 300 accesses the 3D model metadata 116 associated with the video clip, and the same software application 300 or another software application then provides for a 3D display of the modeled 3D space represented by the 3D model metadata 116 at the VR/AR display device 112 (e.g., as parallel streams of stereoscopic imagery as shown in FIG. 5). As explained above, this 3D display process includes the transform of each picture of the 2D video clip into two corresponding surfaces (one for the left-eye image and one for the right-eye image) for incorporation into the parallel streams of stereoscopic imagery so that the picture appears to be displayed at, or projected from, a projection surface specified for the modeled 3D space.

Figure 6:
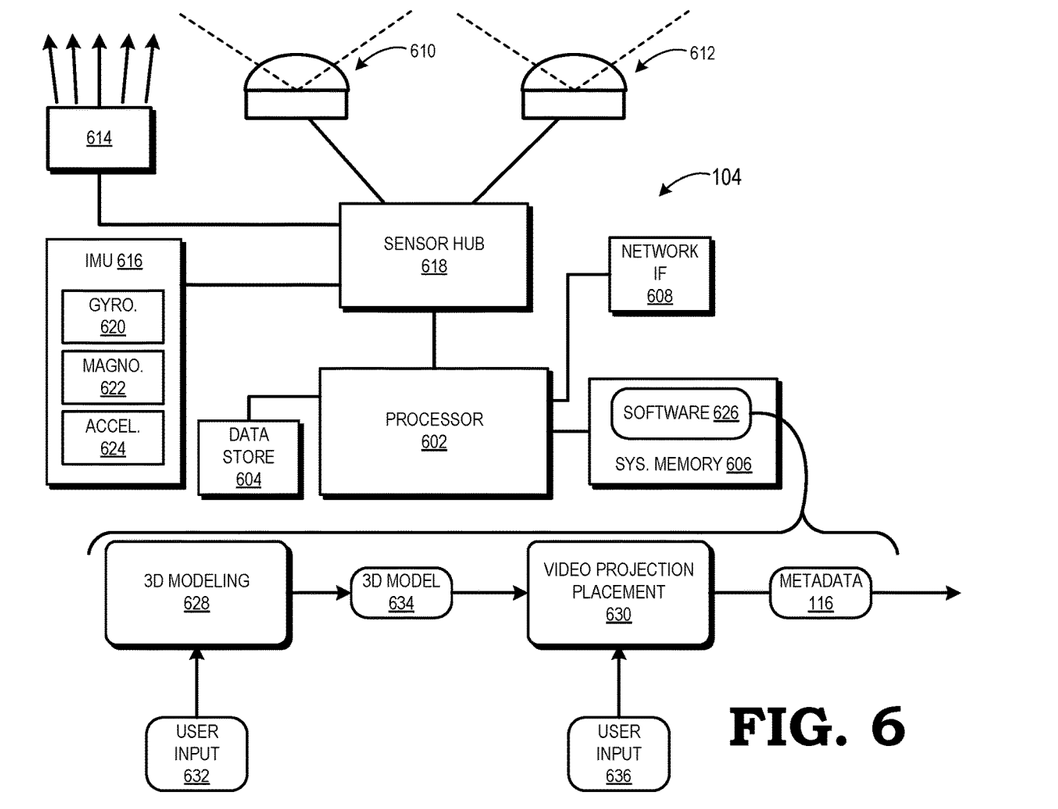
FIG. 6 is a diagram illustrating a processing system of a device for generating a representation of a modeled 3D space in association with 2D video content in accordance with some embodiments.

FIG. 6 illustrates an example implementation of the content source system 104 of the multimedia distribution system 100 of FIG. 1 in accordance with some embodiments. In the depicted example, the content source system 104 includes at least one processor 602, a data store 604, system memory 606 or other software storage component, and a network interface 608 to the network 108 (FIG. 1). Further, in some embodiments, the content source system 104 provides optical flow, simultaneous location and mapping (SLAM), or other image-capture-based telemetry functionality, and thus may include a set of imaging cameras 610, 612, a depth sensor 614, an inertial measurement unit (IMU) 616, and a sensor hub 618 to control the components 610-616. The IMU 616 can include, for example, one or more of a gyroscope 620, a magnetometer 622, an accelerometer 624, and the like.

The system memory 606 stores a software application 626 (one embodiment of software application 300 of FIG. 3) that includes executable instructions that are accessed and executed by the at least one processor 602, and when so executed, manipulate the processor 602 to provide, in conjunction with the other components, the various functionality described herein with respect to the content source system 104. To this end, the software application 626 is arranged as a set of modules, including a 3D modeling module 628 and a video projection placement module 630.

Figure 7:
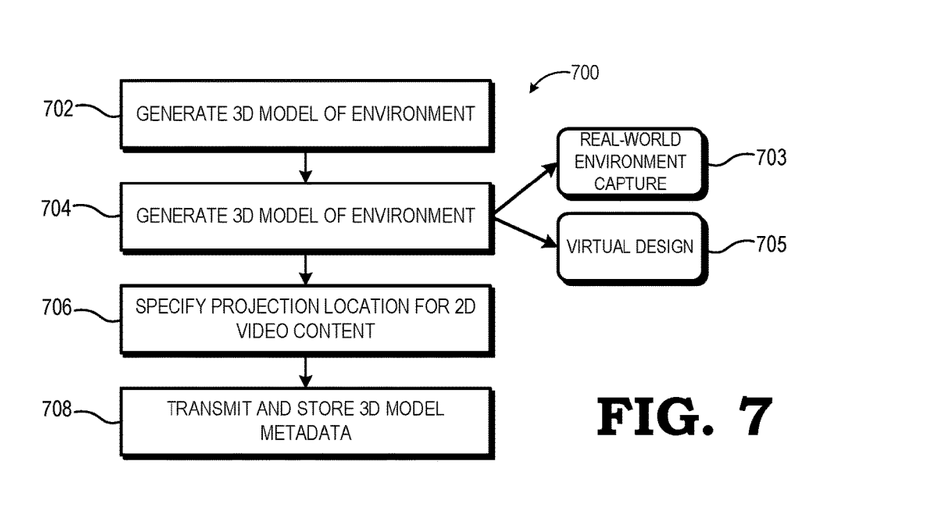
FIG. 7 is a flow diagram illustrating a method for generating a representation of a modeled 3D space and specifying a projection surface for 2D video content within that modeled space in accordance with some embodiments.

FIG. 7 illustrates an example method 700 of operation of the implementation of the content source system 104 depicted in FIG. 6 for generating and providing the 2D video data 114 and 3D model metadata 116 for distribution to other systems in accordance with some embodiments. The method 700 initiates at block 702 with the identification, generation, or other determination of 2D video content to be made available for either 2D or 3D display. In some embodiments, the determination of 2D video content may include selection of previously-generated 2D video content. For example, a content provider may select a 2D video clip from a database of 2D video clips stored in the data store 604 for 2D/3D processing as described herein. In other embodiments, the 2D video content is generated expressly to be available for the 2D/3D display option process described herein. In such instances, the 2D video content may be captured via one of the imaging cameras 610, 612, generated via a computer graphics application, or a combination thereof. In the event that the 2D video content is generated at block 702, the generated 2D video content may be provided for storage as the 2D video data 114 at the data store 604. Further, at block 702 the generated or selected 2D video data 114 may be transmitted via the network interface 608 to the multimedia server 102 for storage and subsequent distribution.

At block 704, the 3D modeling module 628 is executed at the content source system 104 so as to generate a 3D model of a specified space based on user input 632 during the 3D modeling process. As represented by block 703, the content provider may desire to generate a 3D model of a real-world space. To illustrate, if the 2D video content represents the content provider playing a video game in a living room, the content provider may desire to generate a 3D model of that living room so as to give a viewer a sense of being in the living room and watching the game being played out. Accordingly, the 3D modeling process of block 704 may include, for example, the 3D modeling module 628 utilizing the imaging cameras 610, 612 to capture imagery of the real-world space, utilizing the depth sensor 614 to capture depth information for the real-world space, and utilizing the IMU 616 to determine pose information during capture of the imagery and depth information, and from this information determine various pertinent spatial features of the real-world space in the context of a reference coordinate frame tied to the real-world space. The 3D modeling module 628 then may use these spatial features and this reference coordinate frame to generate a 3D model 634 (FIG. 6) of the spatial geometry of the real-world space. Alternatively, as represented by block 705, the content provider may desire to generate a 3D model of a virtual space, in which case the 3D modeling module 628 may employ, or coordinate with, a CAD tool or other VR tool to construct a 3D model 634 (FIG. 6) of this virtual space.

With the modeled 3D space specified, at block 706 the video projection placement module is executed at the content source system 104 so as to identify, based on user input 636 (FIG. 6), a projection surface within the modeled 3D space upon which the 2D video content may be presented or otherwise projected. To illustrate, the content provider may specify the coordinates of the corners of a planar region within the modeled 3D space to serve as the projection surface.

At block 708, the video projection placement module 630 combines data representative of the 3D model 634 and data representative of the selected projection surface (that is, projection location information 118, FIG. 1) to generate the 3D model metadata 116, and provides the 3D model metadata 116 to the network interface 608 for transmission to the multimedia server 102 for subsequent distribution in association with the corresponding 2D video data 114. In some embodiments, the video projection placement module 630 provides the 3D model metadata 116 as part of the 2D video data 114, such as by embedding the 3D video data 114 into metadata fields of the container for the 2D video data 114 or by encoding the 3D video data 114 directly into pixels of pictures of the 2D video data 114. Alternatively, the 3D model metadata 116 may be provided as a separate file or other data container, and the 2D video data 114 may include an ID or other reference to the 3D model metadata 116 so that the multimedia server 102 may identify the 3D model metadata 116 as associated with the 2D video data 114, and vice versa. In still other embodiments, the 3D model metadata 116 may be associated with the content provider, and thus apply to all 3D-display-enabled video clips provided by the content provider. To illustrate, using again the YouTube™ example from above, the content provider may model the living room in which the content provider plays video games, and each video game clip uploaded by the content provider may, by default, be made available for projected 3D display within this modeled living room on the basis of the video clip being sourced from this particular content provider.

Figure 8:
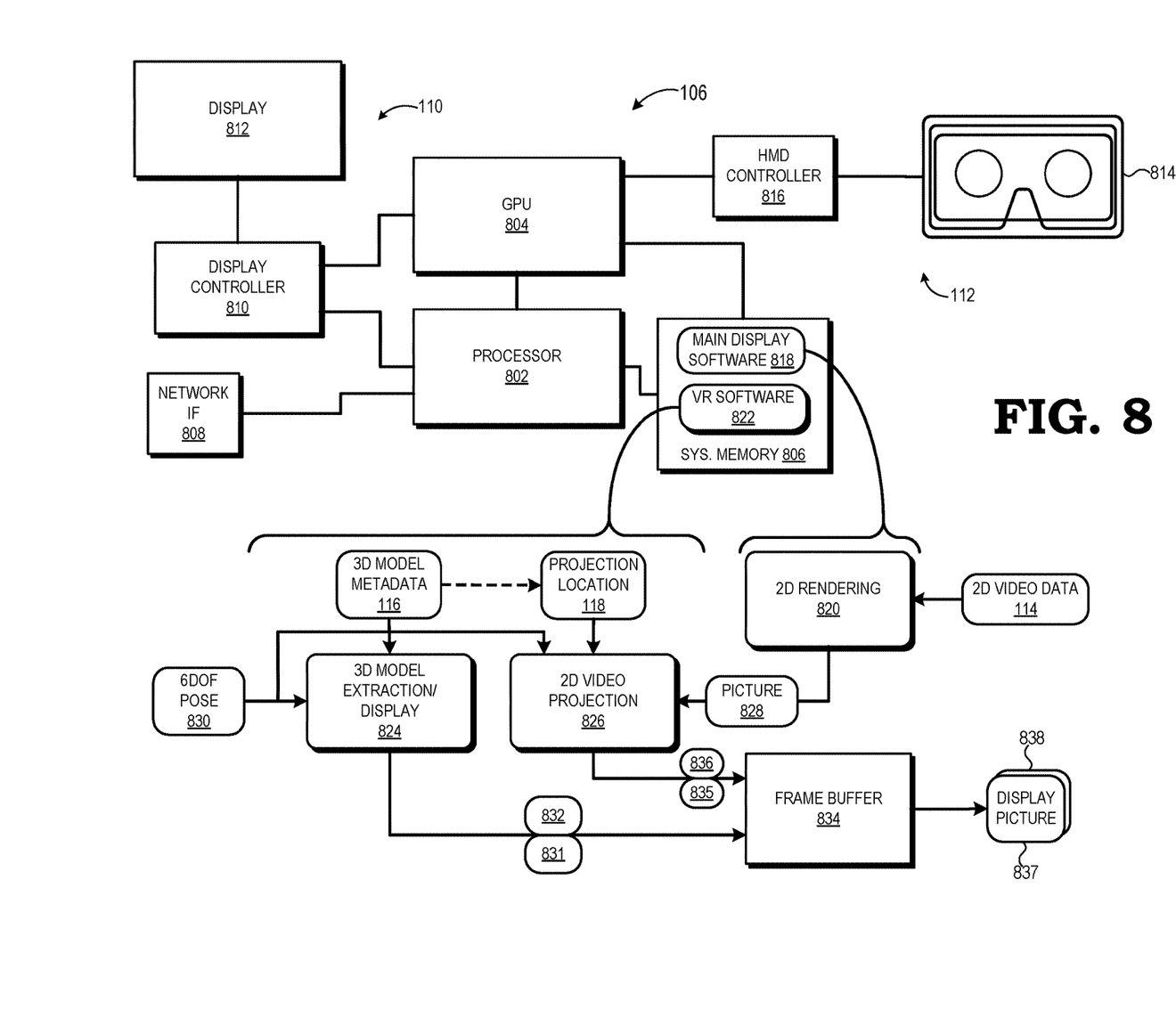
FIG. 8 is a diagram illustrating a processing system of a device for providing 2D/3D display options for 2D video content with an associated modeled 3D space in accordance with some embodiments.

FIG. 8 illustrates an example implementation of the 2D/3D display system 106 of the multimedia distribution system 100 of FIG. 1 in accordance with at least one embodiment. In the depicted example, the system 106 includes at least one application processor 802, at least one graphics processing unit (GPU) 804, system memory 806 or other storage component, a network interface 808 to couple to network 108 (FIG. 1), a display controller 810, a display panel 812, and the VR/AR display device 112, which in the depicted embodiment includes an HMD 814 and an HMD controller 816. The system memory 806 stores one or more software applications that support the functionality of the 2D/3D display system 106 as described herein, such as main display software 818 that represents the one or more software applications that operate to manipulate the 2D/3D display system 106 to display one or more GUIs to facilitate display of a list, array, or other listing of 2D video streams available for selection by the user (e.g., via a web page displayed on a web browser), to facilitate access of the 2D video data 114 associated with a video stream selected by the user from the multimedia server 102, and the 2D display of the video content represented by the 2D video data 114 in the event that the 2D view mode is selected for the selected 2D video stream. To this end, the main display software 818 may include, for example, a rendering module 820 to decode the 2D video data 114 and render the decoded data into a series of pictures representing the video content of the 2D video data 114, as described in detail below.

The software applications stored by the system memory 806 further includes one or more VR software applications 822 that operate to manipulate the 2D/3D display system 106 to render parallel stereoscopic imagery streams for display of VR or AR content at the HMD 814 via the HMD controller 816, and, in the event that the user elects to view the video content in the 3D view mode, the one or more VR software applications 822 further operate to support the display of the video content in the 3D view mode. To this end, the one or more software applications 822 include a 3D model extraction/display module 824 and a 2D video projection module 826. The operation of modules 824, 826 is described in greater detail below.

Figure 9:
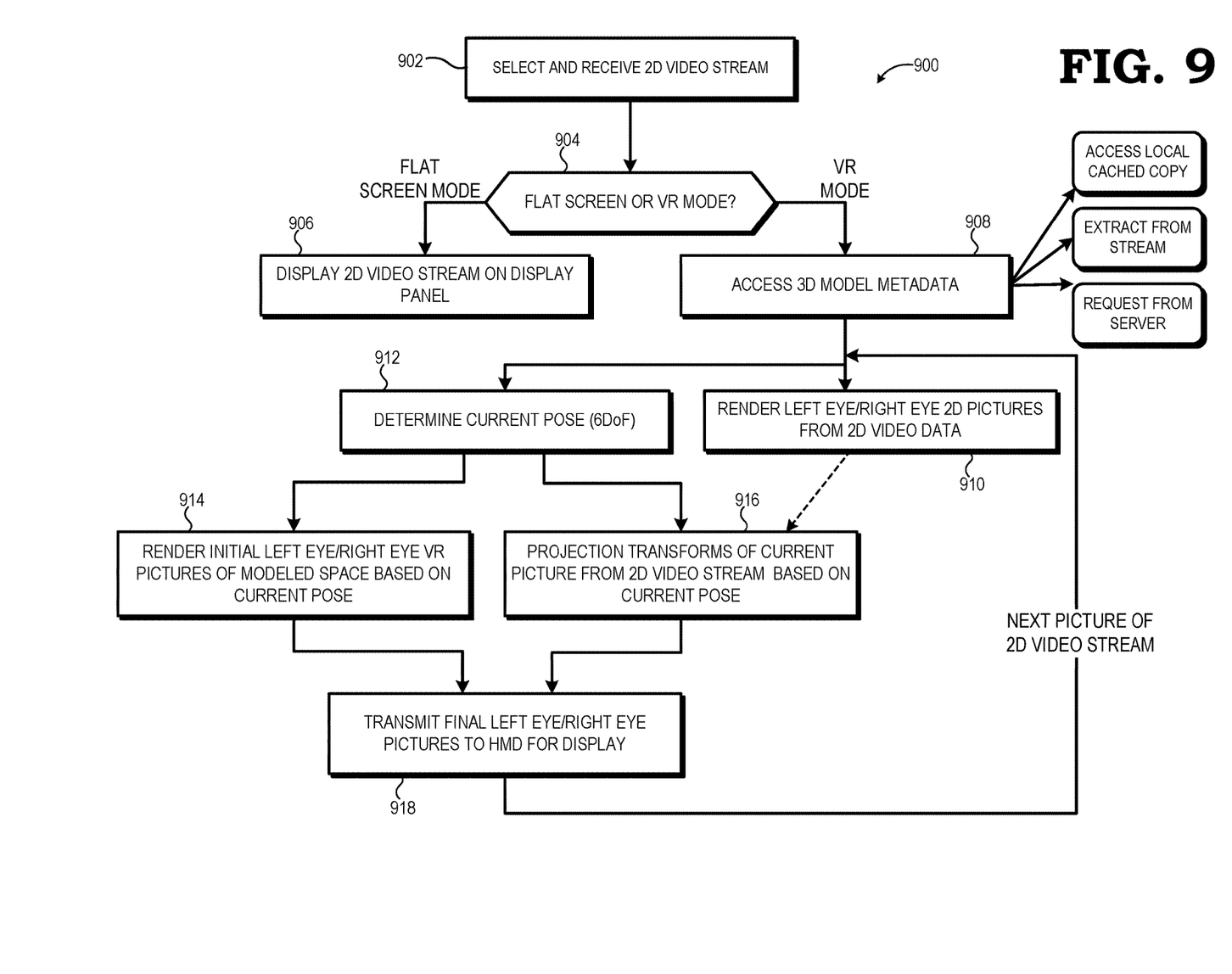
FIG. 9 is a flow diagram illustrating a method for 2D/3D optional display of 2D video content with an associated modeled 3D space in accordance with some embodiments.

FIG. 9 illustrates an example method 900 of operation of the implementation of the 2D/3D display system 106 of FIG. 8 in accordance with at least one embodiment of the present disclosure. The method 900 initiates at block 902 with the user selecting a 3D-display-enabled 2D video stream for presentation at the 2D/3D display system 106 and receiving the 2D video data 114 for the selected 2D video stream responsive to this selection. To illustrate, the user may be browsing a video-sharing website and select the video stream from a plurality of video streams presented as options. In response to the selection, the main display software application 818 sends a request for the corresponding 2D video data 114 to the multimedia server 102 via the network interface 808. The multimedia server 102, in response, transmits the 2D video data 114 back to the 2D/3D display system 106, where it is buffered for processing.

At block 904 the main display software application 818 determines whether the selected video stream is enabled for 3D display and, if so, presents the user with the option to view the selected video stream in a flat screen mode (that is, the conventional 2D view mode) or a VR mode (that is, the projected 3D view mode described herein). The main display software application 818 may make this determination, for example, based on a field or value stored in the 2D video data 114 itself, based on the presence or absence of 3D model metadata 116 associated with the 2D video data 114, based on the source or content provider of the 2D video data 114, and the like. As described above, the option to view the video content in either the 2D view mode or the 3D view mode may be presented as, for example, a user input field or other GUI widget within the GUI of a video sharing website or other software application that serves as the source of the selected 2D video stream.

In the event that the user selects the flat screen mode, at block 906 one or both of the application processor 802 or the GPU 804 decodes the 2D video data 114 and renders a sequence of pictures represented by the resulting decoded video data, and each picture is presented for display in a corresponding display window (e.g., display window 302 of FIG. 3) at the display panel 812 via the display controller 810 in accordance with the conventional 2D display process.

Returning to block 904, in the event that the user selects the 3D view mode for the selected video stream, at block 908 the 3D model extraction/display module 824 accesses the 3D model metadata 116 associated with the selected video stream. As explained above, in some embodiments the 3D model metadata 116 is embedded as metadata in the 2D video data 114 or encoded within the pixel data itself, in which case the 3D model extraction/display module 824 can access the 3D model metadata 116 by extracting it from the 2D video data 114. In other embodiments, the 3D model metadata 116 is made available separate from the 2D video data 114 for bandwidth, compatibility, or flexibility considerations. To illustrate, the 3D model metadata 116 may be stored as a separate file that is referenced via an HTML link or other remote storage location ID by the 2D video data 114. In such instances, the 3D model extraction/display module 824 can access the 3D model metadata 116 by using the remote storage location ID to request the 3D model metadata 116 from the multimedia server 102. In still other embodiments, the 3D model metadata 116 may have been previously stored at the 2D/3D display system 106. To illustrate, a content provider may use the same modeled 3D space for all of the 2D video streams provided by the content provider, and thus when a user views one 2D video stream, the 3D model metadata 116 representing the modeled 3D space may be downloaded and stored at the 2D/3D display system 106 for use both with current 2D video stream and any subsequently accessed 2D video streams from that same content provider. In such instances, accessing the 3D model metadata 116 may include identifying that a copy of the 3D model metadata 116 is already stored at a local storage location (e.g., a local hard drive) and accessing the 3D model metadata 116 from the identified local storage location.

It will be appreciated that the VR/AR display device 112 has a frame rate that represents the rate at which the HMD controller 816 drives left eye/right eye pictures to the HMD 814 for display. In one embodiment, the process described below for blocks 910, 912, 914, 916, and 918 represents the process performed for each stereoscopic display picture pair to be provided to the HMD 814 for display, and thus iterations of this process are performed at the frame rate of the VR/AR display device 112. Further, it is assumed in the following that the frame rate of the selected video stream is the same as the frame rate of the VR/AR display device 112. However, if the frame rate of the selected video stream is lower, the same picture from the selected video stream may be utilized for two or more display frames for the VR/AR display device 112. Alternatively, if the frame rate of the selected video stream is higher, selective dropping of pictures from the video stream may be employed to achieve an effective match between frame rates.

At block 910, the rendering module 820 decodes a portion of the 2D video data 114, renders a picture 828 from the resulting decoded data, and provides the picture 828 to the 2D video projection module 826. In parallel, at block 912 the processor 802 determines a current 6 DoF or 3 DoF pose 830 (FIG. 8) of the HMD 814 based on sensor information from an IMU (not shown) of the HMD 814, based on spatial features detected in imagery captured by imaging cameras (not shown) of the HMD 814, and the like, using any of a variety of well-known HMD pose-determination techniques.

At block 914, the 3D model extraction/display module 824 uses the 3D model of a space represented by the 3D model metadata 116 and the current pose 830 to render a stereoscopic pair of pictures 831, 832 (one picture each for the left and right eyes of the user) representing a 3D view of the space from the current pose 830 and writes the pair of pictures 831, 832 to a frame buffer 834 for temporary storage. Concurrently, at block 916 the 2D video projection module 826 uses the current pose 830 and the projection surface represented by the projection location information 118 extracted from the 3D model metadata 116 to transform the rendered picture 828 from the flat 2D coordinate reference to fit the projection surface in the coordinate reference of the modeled 3D space relative to the current pose 830, resulting in a pair of transformed picture textures 835, 836, one for each of the left and right eyes. The transformed picture textures 835, 836 are then written to the frame buffer 834, and stored such that the transformed picture texture 835 occludes a region of the picture 831 that corresponds to the position of the projection surface in the picture 831, and the transformed picture texture 836 likewise occludes a region of the picture 832 that corresponds to the position of the projection surface in the picture 832, At block 918, the HMD controller 816 accesses the frame buffer 834 and transmits the resulting final display pictures 837, 838 to the HMD 814 for concurrent display so as to be perceived by the user as 3D image content having the 2D picture 828 from the 2D video data 114 appear to be projecting from a designated surface within the space represented in the 3D image content. The process of blocks 910-918 then may repeat for the next picture from the 2D video data 114 and an updated pose 830.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. In a display system having a head mounted display (HMD), a method comprising:
    receiving video data representative of two-dimensional (2D) video content;
    receiving model data representative of a modeled three-dimensional (3D) space and representative of a surface within the modeled 3D space upon which the 2D video content is to be projected;
    determining, at the display system, whether a 2D view mode or 3D view mode is selected; and
    responsive to determining that the 3D view mode is selected:
        determining a current pose of the HMD;
        rendering, based on the model data, a first stereoscopic pair of images representing a 3D view of the modeled 3D space from the current pose;
        rendering, based on a 2D image of the 2D video content, a second stereoscopic pair of images;
        transforming the second stereoscopic pair of images into a pair of transformed picture textures that fit the surface within the modeled 3D space for a current view perspective for respective images of the first stereoscopic pair of images based on the current pose of the HMD;
        storing the first stereoscopic pair of images and the transformed picture textures as a stereoscopic pair of display pictures, wherein the transformed picture textures occlude portions of the first stereoscopic pair of images corresponding to the surface; and
        providing, via display of the stereoscopic pair of display pictures at the HMD, the 3D view of the modeled 3D space based on the current pose, wherein the surface is perceivable as projecting a 2D view of the 2D image from the current view perspective of the modeled 3D space.

2. The method of claim 1, further comprising:
responsive to determining that the 2D view mode is selected, providing, via a display panel of the display system, a 2D display of the 2D video content.

3. The method of claim 1, wherein:
receiving the model data comprises receiving the model data as metadata in the video data.

4. The method of claim 1, wherein:
receiving the model data comprises:
    receiving, with the video data, an identifier of a remote storage location of the model data; and
    accessing the model data from the remote storage location using the identifier.

5. The method of claim 1, wherein:
receiving the model data comprises:

receiving, with the video data, an identifier associated with the model data; and accessing the model data from a local data storage location of the display system based on the identifier.

6. The method of claim 1, further comprising:

presenting, to a user via the display system, an option to view the 2D video content in either the 2D view mode or the 3D view mode; and wherein determining whether the 2D view mode or 3D view mode is selected comprises determining whether the 2D view mode or 3D view mode is selected based on user input responsive to presenting the option.

7. A display system comprising:

a head mounted device (HMD);

at least one processor coupled to the HMD; and a storage component coupled to the at least one processor, the storage component to store a set of executable instructions accessible to the at least one processor, wherein the set of executable instructions are configured to manipulate the at least one processor to:

receive video data representative of two-dimensional (2D) video content;

receive model data representative of a modeled three-dimensional (3D) space and representative of a surface within the modeled 3D space upon which the 2D video content is to be projected;

determine whether a 2D view mode or 3D view mode is selected; and responsive to determining that the 3D view mode is selected:

determine a current pose of the HMD;

render, based on the model data, a first stereoscopic pair of images representing a 3D view of the modeled 3D space from the current pose;

render, based on a 2D image of the 2D video content, a second stereoscopic pair of images;

transform the second stereoscopic pair of images into a pair of transformed picture textures that fit the surface within the modeled 3D space for a current view perspective for respective images of the first stereoscopic pair of images based on the current pose of the HMD;

storing the first stereoscopic pair of images and the transformed picture textures as a stereoscopic pair of display pictures, wherein the transformed picture textures occlude portions of the first stereoscopic pair of images corresponding to the surface; and provide, to the HMD via display of the stereoscopic pair of display pictures, the 3D view of the modeled 3D space based on the current pose, wherein the surface is perceivable as projecting a 2D view of the 2D image from the current view perspective of the modeled 3D space.

8. The display system of claim 7, wherein the set of executable instructions further is configured to manipulate the at least one processor to:

responsive to determining that the 2D view mode is selected, provide, via a display panel of the display system, a 2D display of the 2D video content.

9. The display system of claim 7, wherein:

the display system is to receive the model data as metadata in the video data.

10. The display system of claim 7, wherein:

the display system is to receive, with the video data, an identifier of a remote storage location of the model data; and the set of executable instructions to manipulate the at least one processor to receive the model data comprise instructions to manipulate the at least one processor to access the model data from the remote storage location using the identifier.

11. The display system of claim 7, wherein:

the set of executable instructions to manipulate the at least one processor to receive the model data comprise instructions to manipulate the at least one processor to:

receive, with the video data, an identifier associated with the model data; and access the model data from a local data storage location of the display system based on the identifier.

12. The display system of claim 7, wherein the set of executable instructions further includes instructions to manipulate the at least one processor to:

present, to a user via the display system, an option to view the 2D video content in either the 2D view mode or the 3D view mode; and determine whether the 2D view mode or 3D view mode is selected based on user input responsive to presenting the option.

13. In a processing device, a method comprising:

determining a three-dimensional (3D) model of a space;

identifying a surface in the 3D model of the space upon which two-dimensional (2D) video content is to be projected; and providing video data representative of the 2D video content and model data representative of the 3D model of the space for storage so as to be available for subsequent access by a display system, wherein the video data representative of the 2D video content includes a stereoscopic pair of images rendered, transformed into picture textures, and stored such that the transformed picture textures occlude portions of the surface such that the surface is perceivable, within a pose-dependent 3D view perspective of the 3D model of the space, as projecting a 2D view of the 2D video content.

14. The method of claim 13, wherein:

the space comprises a real-world space; and determining the 3D model of the space comprises:

capturing imagery and spatial features of the real-world space using a set of one or more sensors of the processing device, the set of one or more sensors including at least one of: an imaging camera or a depth sensor; and generating the 3D model of the space based on the captured imagery and spatial features.

15. The method of claim 13, wherein:

determining the 3D model of the space comprises constructing the 3D model using a virtual reality modeling tool at the processing device.

16. The method of claim 13, wherein:

providing the video data and model data for storage comprises providing the video data and model data for storage at a multimedia server.

17. The method of claim 16, wherein:

providing the video data and model data for storage the multimedia server comprises providing the video data as a video stream and providing the model data as metadata in the video stream.

18. The method of claim 16, wherein:

providing the video data and model data for storage the multimedia server comprises providing the video data as a video stream and providing an identifier associated with the model data in the video stream, the identifier comprising at least one of: an identifier of a storage location of the model data at the multimedia server or an identifier of the model data for use in accessing a local copy of the model data stored at the display system.

19. A processing device comprising:
   at least one processor; and
   a storage component coupled to the at least one processor, the storage component to store a set of executable instructions, the set of executable instructions to manipulate the at least one processor to:
   determine a three-dimensional (3D) model of a space;
   identify a surface in the 3D model of the space upon which two-dimensional (2D) video content is to be projected; and
   provide video data representative of the 2D video content and model data representative of the 3D model of the space for storage so as to be available for subsequent access by a display system, wherein the video data representative of the 2D video content includes a stereoscopic pair of images rendered, transformed into picture textures, and stored such that the transformed picture textures occlude portions of the surface such that the surface is perceivable, within a pose-dependent 3D view perspective of the 3D model of the space, as projecting a 2D view of the 2D video content.

20. The processing device of claim 19, further comprising:
   a set of one or more sensors, the set of one or more sensors including at least one of an imaging camera and a depth sensor;
   wherein the space comprises a real-world space; and
   wherein the set of executable instructions to manipulate the at least one processor to determine the 3D model of the space comprise instructions to manipulate the at least one processor to:
   capture imagery and identify spatial features of the real-world space using the set of one or more sensors; and
   generate the 3D model of the space based on the captured imagery and spatial features.

21. The processing device of claim 19, wherein:
   the space is a virtual space; and
   the set of executable instructions to manipulate the at least one processor to determine the 3D model of the space comprise instructions to manipulate the at least one processor to construct the 3D model via virtual reality modeling.

22. The processing device of claim 19, further comprising:
   a network interface to couple to a network; and
   wherein the processing device is to provide the video data and model data for storage at a multimedia server via the network.

23. The processing device of claim 22, wherein:
   the processing device is to provide the video data for storage at the multimedia server as a streaming video file and to provide the model data as metadata in the streaming video file.

24. The processing device of claim 22, wherein:
   the processing device is to provide the video data as a streaming video file for storage at the multimedia server and to provide an identifier associated with the model data in the streaming video file, the identifier comprising at least one of: an indicator of a storage location of the model data at the multimedia server or an identifier of the model data for use in accessing a local copy of the model data stored at the display system.

* * * * *